US008533985B2

(12) United States Patent
Hillis

(10) Patent No.: US 8,533,985 B2
(45) Date of Patent: Sep. 17, 2013

(54) MAGNETIC PLANNING BOARD WITH STACKABLE, SNAP-TO-GRID, SELF-ALIGNING ITEMS

(75) Inventor: W. Daniel Hillis, Encino, CA (US)

(73) Assignee: Applied Minds, LLC, Glendale, CA (US)

( * ) Notice: Subject to any disclaimer, the term of this patent is extended or adjusted under 35 U.S.C. 154(b) by 2112 days.

(21) Appl. No.: 11/218,938

(22) Filed: Sep. 1, 2005

(65) Prior Publication Data

US 2007/0044360 A1 Mar. 1, 2007

(51) Int. Cl.

| | |
|---|---|
| ***G09F 3/18*** | (2006.01) |
| ***G09F 3/20*** | (2006.01) |
| ***G09F 7/04*** | (2006.01) |
| ***G09B 19/22*** | (2006.01) |
| ***G09B 27/08*** | (2006.01) |

(52) U.S. Cl.

USPC ............... 40/649; 40/621; 434/128; 434/134; 434/73; 434/168; 434/172; 446/131; 446/132; 273/448; 273/155; 273/239

(58) Field of Classification Search

USPC ..................... 40/649, 621; 434/128, 134, 73, 434/168, 172; 446/131, 132; 273/448, 155, 273/239

See application file for complete search history.

(56) References Cited

U.S. PATENT DOCUMENTS

| | | | | |
|---|---|---|---|---|
| 3,769,720 | A * | 11/1973 | Terrones | 434/127 |
| 3,942,147 | A | 3/1976 | Josephson | |
| 4,176,478 | A | 12/1979 | Brewer | |
| 4,326,720 | A * | 4/1982 | Erlich | 273/239 |
| 4,525,943 | A * | 7/1985 | Iwata | 40/110 |
| 4,865,324 | A * | 9/1989 | Nesis | 273/155 |
| 5,328,188 | A * | 7/1994 | Brotz | 273/239 |
| 5,347,733 | A * | 9/1994 | Whittington | 40/1.5 |
| 5,662,326 | A * | 9/1997 | Gebran | 273/239 |
| 5,771,619 | A * | 6/1998 | Wells | 40/643 |
| 5,799,423 | A | 9/1998 | Malino | |
| 5,960,848 | A * | 10/1999 | Schirer | 160/135 |
| 6,182,387 | B1 | 2/2001 | Duguay | |
| 6,326,945 | B1 | 12/2001 | Williams | |
| 6,360,464 | B1 | 3/2002 | Tate | |
| 6,491,781 | B1 * | 12/2002 | Kreckel et al. | 156/277 |
| 6,626,303 | B1 * | 9/2003 | Moodie | 211/70.7 |

* cited by examiner

*Primary Examiner* — Joanne Silbermann
*Assistant Examiner* — Syed A Islam
(74) *Attorney, Agent, or Firm* — Perkins Coie LLP; Michael A. Glenn

(57) ABSTRACT

The invention provides a simple, yet flexible mechanism for affixing items to a magnetic board such that they are accurately aligned to the board and to one another. Such mechanism allows positioning and repositioning of the items as desired by the user, including stacked configurations. Contact between the items and the board is aesthetically pleasing, and provides a bearing surface that allows for repositioning of items using a sliding motion. Further, aligning the items is convenient for the user and does not distract from the primary task at hand.

14 Claims, 6 Drawing Sheets

MAGNETIC PLANNING BOARD WITH STACKABLE, SNAP-TO-GRID, SELF-ALIGNING ITEMS

BACKGROUND OF THE INVENTION

1. Technical Field

The invention relates to planning boards. More particularly, the invention relates to a magnetic planning board with stackable, snap-to-grid, self-aligning items.

2. Description of the Prior Art

Magnetic white boards, planning boards, and calendar boards are a ubiquitous element of the modern workplace. For example, Magna Visual, Inc. of St. Louis, Mo., offers a planning kit in which a number of rectangular items of varied color and labeled with textual information may be affixed to a magnetic board. Each item can be labeled with information such as a project name, a team member name, a task, or a date, and arranged to illustrate the plan of action required to reach a particular objective.

Because such information is typically structured in nature, the Magna Visual planning kit, as with many other similar products, features an embedded grid that enables users to align the items affixed to the board more accurately. However, such grids serve only as a visual guide. There is no mechanical action that guides the user in aligning the affixed items to the board or to one another. In practice, accurately aligning the items to the visual grid is a delicate, time consuming process that distracts users from the underlying planning activity. Indeed, the visual grid often merely calls attention to improperly aligned items.

What is needed is a more convenient method of accurately aligning the affixed items to the board and, therefore, to one another.

U.S. Pat. No. 6,626,303 does disclose a magnetic display board that provides accurate mounting of display articles. In the disclosed display board, each display article must be mounted "at a pre-determined display location," as is suitable for the display of set collection of items for sale in a department store. Such an approach does not provide the flexibility that is required for other applications, such as planning and calendar boards. Also, because magnets are directly affixed to the rear surface of the display articles, the displayed articles are not positioned flush with the display boards but, instead, hover above the surface. While this may be appropriate for a sales display, it compromises the aesthetics of the display in many other applications, such as planning and calendar boards.

Furthermore, the magnet itself must serve as the bearing surface between the article and the display board. This bearing surface may not provide desirable friction characteristics should the affixed items be repositioned using a sliding motion, as is common during the use of planning boards and planning calendars.

It would be advantageous to provide a simple, yet flexible mechanism for affixing items to a magnetic board such that they are accurately aligned to the board and to one another. It would also be advantageous if such mechanism allowed positioning and repositioning of the items as desired by the user, including stacked configurations. It would also be desirable if contact between the items and the board is aesthetically pleasing, and provides a bearing surface that allows for repositioning of items using a sliding motion. Further, it would be advantageous if aligning the items is convenient for the user and does not distract from the primary task at hand.

SUMMARY OF THE INVENTION

The presently preferred embodiment of the invention provides a simple, yet flexible mechanism for affixing items to a magnetic board such that they are accurately aligned to the board and to one another. Such mechanism allows positioning and repositioning of the items as desired by the user, including stacked configurations. Contact between the items and the board is aesthetically pleasing, and provides a bearing surface that allows for repositioning of items using a sliding motion. Further, aligning the items is convenient for the user and does not distract from the primary task at hand.

DETAILED DESCRIPTION OF THE INVENTION

The invention provides a simple, yet flexible mechanism for affixing items to a magnetic board, such that they are accurately aligned to the board and to one another. The inventive mechanism disclosed herein allows positioning and repositioning of the items as desired by the user, including stacked configurations. Contact between the items and the board is aesthetically pleasing, and provides a bearing surface that allows for repositioning of items using a sliding motion. Aligning the items is convenient for the user and does not distract from the primary task at hand.

Figure 1:
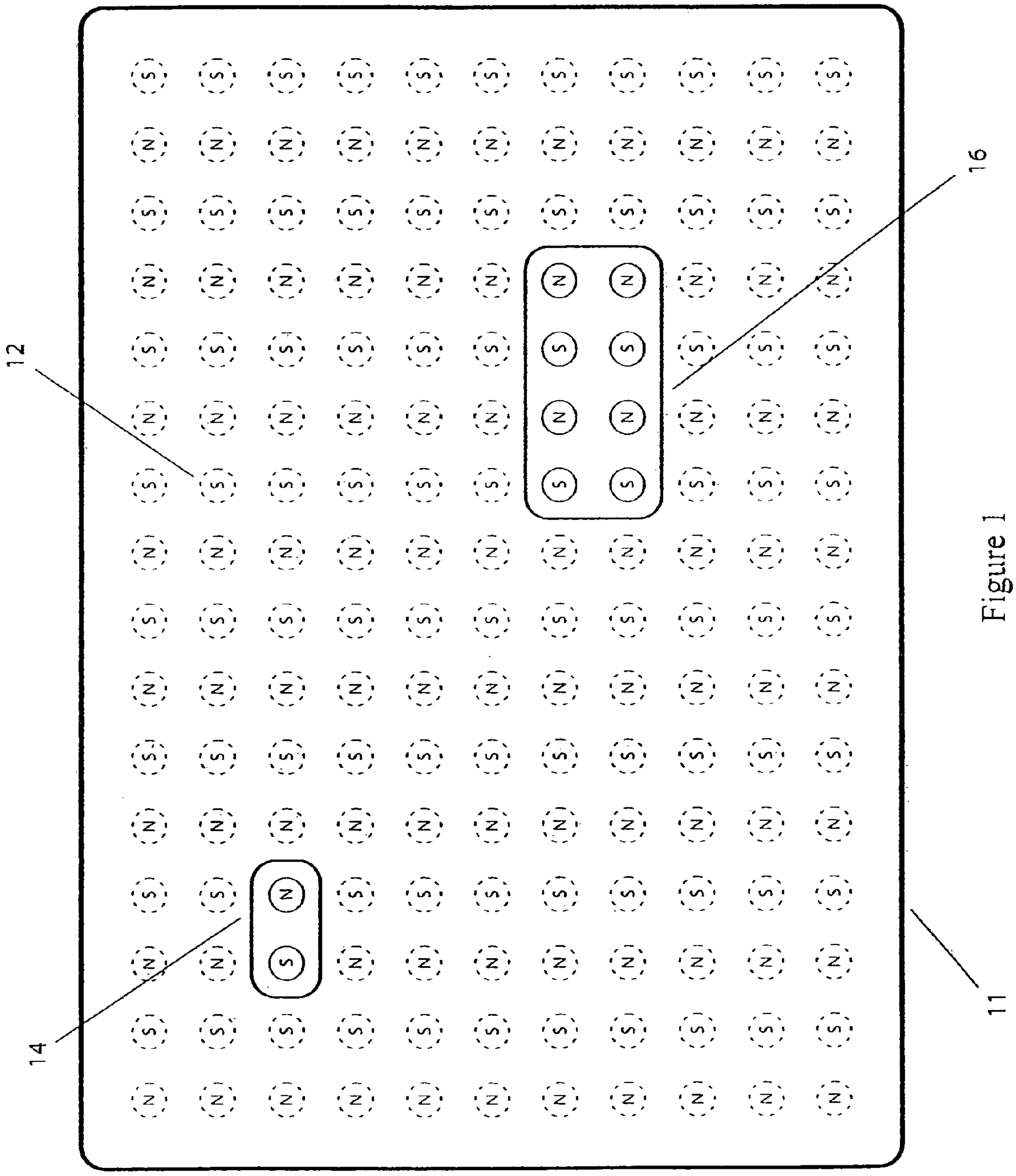
FIG. 1 is a schematic overview of a magnetic planning board according to the invention.

The presently preferred embodiment of the invention provides a magnetic planning board and a method of attaching a first, smaller planar item to a second, larger planar item in a precise, yet repositionable manner, as shown in FIG. 1. The larger planar object, the board 11, contains a magnetic grid 12 consisting of a series of magnets positioned such that the magnetic poles are evenly spaced on a Cartesian grid, with alternating outward facing polarity. Unitary items 14 and multi-unit items 16 that are affixed to the board each contain at least two magnets, separated from one another by a distance equal to the spacing of the magnetic grid and also with opposite outward facing polarity. As an item is placed on the board, it naturally locates in alignment with the underlying magnetic grid as the opposing magnetic poles attract one another. Once aligned with the underlying magnetic grid, the item is secured to the board in alignment with other affixed items.

While the magnetic grid and magnets on the affixed item ensure that the item is properly aligned and secured, the user is not constrained to placing the magnet in a small number of predetermined positions. Rather, the user is free to place and move the item anywhere within the magnetic grid. As a user moves items across the board, he feels an affirming, snap-to-grid action as the item attains one of the many available aligned positions. It is thus a simple matter for a user to position and align a large number of items in an aesthetically satisfying manner.

An item containing exactly two magnets is referred to as a unitary item 14. Larger items based on the unitary item may also be used, such as the 2-by-2 multi-unit item 16 shown in FIG. 1. The presence of at least two magnets within each item ensures that the item is secured against both translation and rotation, thereby maintaining proper alignment. The equal spacing of the magnets in the grid and within the unitary item further allows items to be stacked atop one another when attached to the board and to one another.

Figure 2:
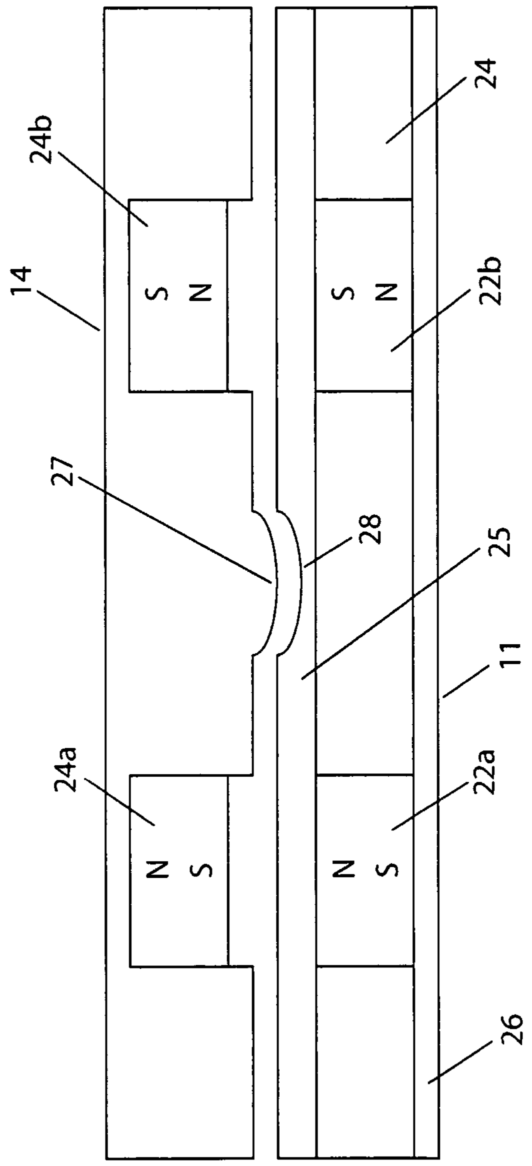
FIG. 2 is a detailed sectional view of a preferred construction method for a magnetic planning board according to the invention.

A preferred form of construction for the invention is shown in FIG. 2. The magnets 22*a*/22*b* that are used to form the magnetic grid 12 are aligned within a grid alignment layer 24 and held captive by an outer layer 25 and inner layer 26 that are attached to the grid alignment layer in a sandwich style construction. The complementary magnets 24*a*/24*b* are recessed within the affixed item 14. Significantly, the depth of the cavities exceeds the thickness of the magnets, ensuring that when the item is affixed to the board, the primary material of the item (and not the magnets) serves as the bearing surface. An additional layer of material, e.g. neoprene, Teflon® (DuPont, Wilmington Del.), which is a fluoropolymer, may be added to the outer surface of the board or the inner surface of the item if specific frictional qualities are desired. In either case, the affixed item directly abuts the board, providing a clean look to the attachment.

If an additional mechanical locating action is desired, each unitary item may be formed with a protrusion 27, preferably between each pair of magnets, and the board may be formed with a depression 28, such that the protrusion engages the depression when the item is aligned with the magnetic grid. This mechanical detent provides further feedback to the user that the item is properly aligned.

The outer layer of the board may be formed of a material such as white ceramic, allowing the surface to be used as a whiteboard. Similarly, the affixed item may be composed entirely of a white ceramic material, or an additional outer layer of white ceramic may be added, allowing the affixed items to be labeled and relabeled as desired by the user. Alternatively, adhesive labels may be used, or the outer surface of the item may be fitted with slots to receive removable label inserts.

DETAILED EXAMPLE

Figure 3A:
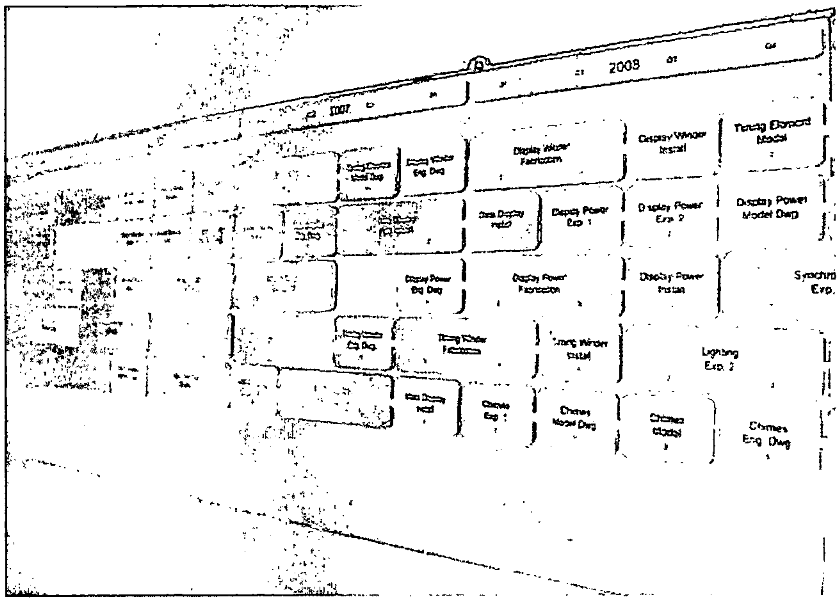
FIGS. 3*a* and 3*b* show a magnetic planning board with snap-to-grid alignment behavior according to the invention.
Figure 3B:
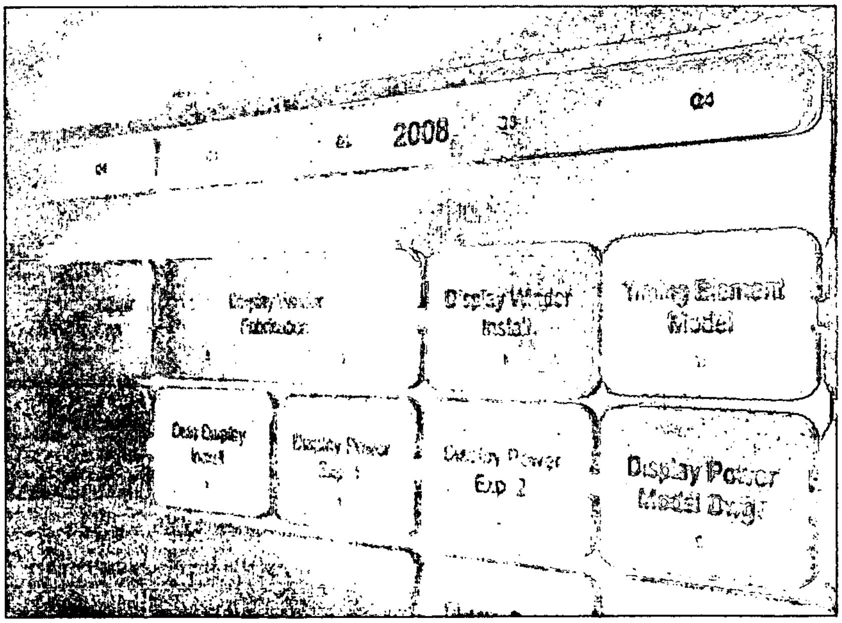

While the invention may be used in a wide array of applications, it is particularly useful as a magnetic calendar or planning board. An example of this application is shown in FIGS. 3*a* and 3*b*. As described above, a number of items of varying size are affixed to the board, and an underlying magnetic grid ensures that the items are aligned with one another, providing a clean, aesthetic look. In this particular example, the majority of the affixed items represent tasks to be completed as part of a project timeline.

Figure 4A:
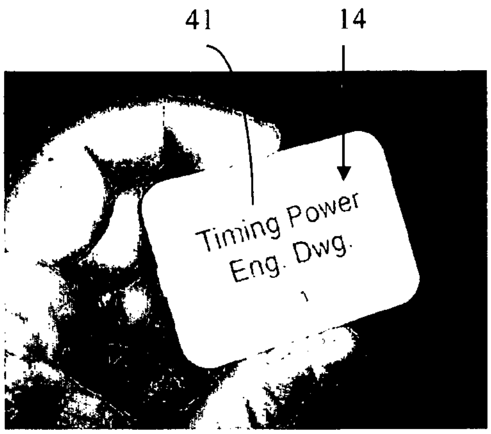
FIGS. 4*a* and 4*b* show the inner and outer surface of a unitary item according to the invention.
Figure 4B:
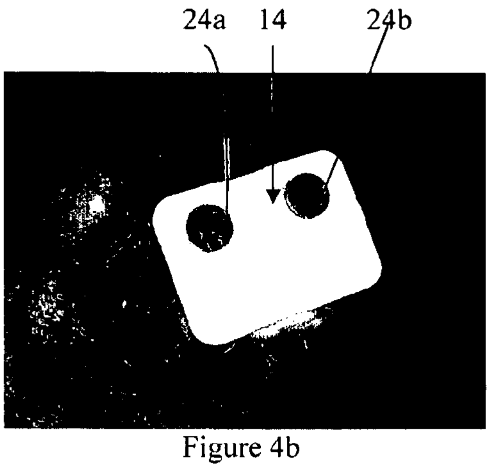

FIGS. 4*a* and 4*b* show a unitary item 14. An adhesive label 41 is adhered to the outer surface of the item, and has been labeled with a particular task. As described above, each unitary item contains exactly two magnets 24*a*/24*b* recessed beyond flush with the inner surface. Also as noted above, larger items may be formed through a repetition of the basic unitary item. These multi-items may themselves be linked to other items, by a fixed attachment, or by a removable fastening mechanism that allows items to be joined and separated as desired by the user.

Figure 5A:
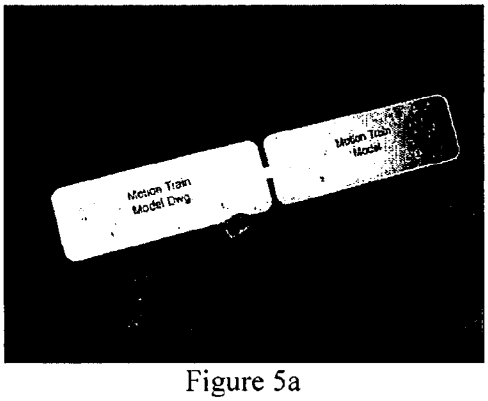
FIGS. 5*a* and 5*b* show outer and inner surfaces of two attached multi-unit items according to the invention.
Figure 5B:
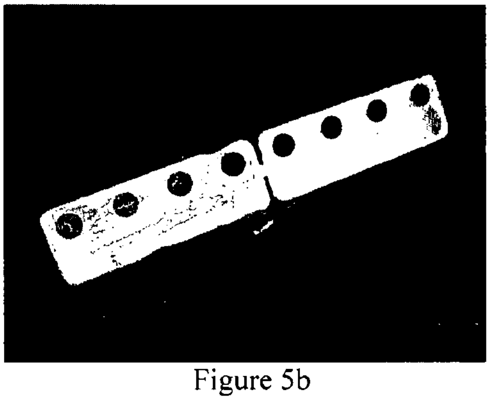

FIGS. 5*a* and 5*b* show two 2-by-2 multi-unit items joined by a fixed attachment. In this instance, the two attached items represent two closely related tasks.

Figure 6A:
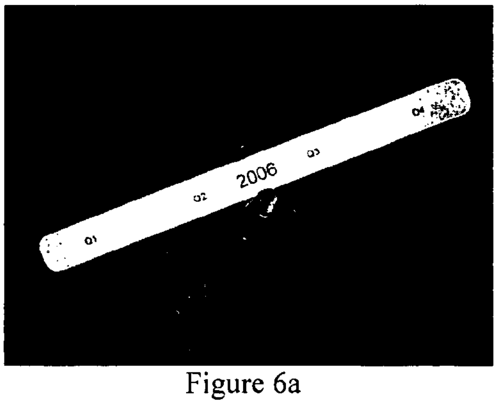
FIGS. 6*a* and 6*b* show an elongated item used to denote a timeline according to the invention.
Figure 6B:
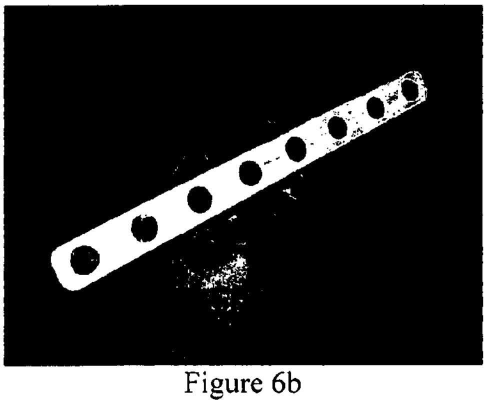

Items of various shapes may be used, including the elongated items shown in FIGS. 6*a* and 6*b*, which denotes a timeline atop the planning board.

Figure 7:
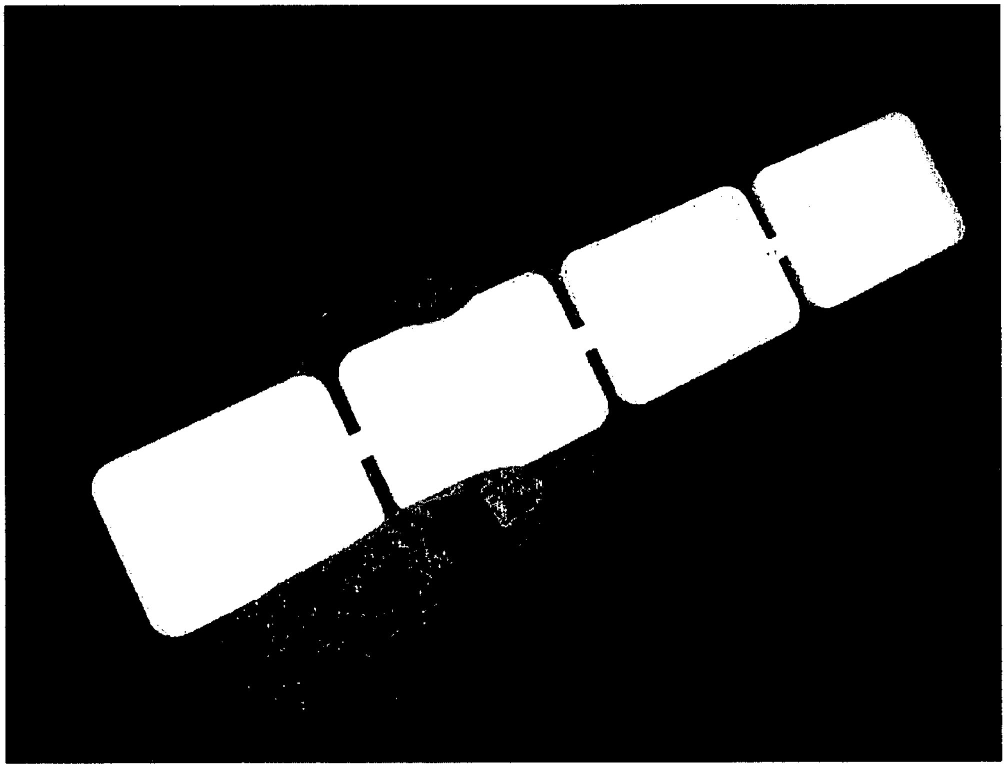
FIG. 7 shows a blank multi-unit item according to the invention.

In addition, unlabelled items, such as that shown in FIG. 7, may be affixed to the board and labeled as desired by the user.

Figure 8:
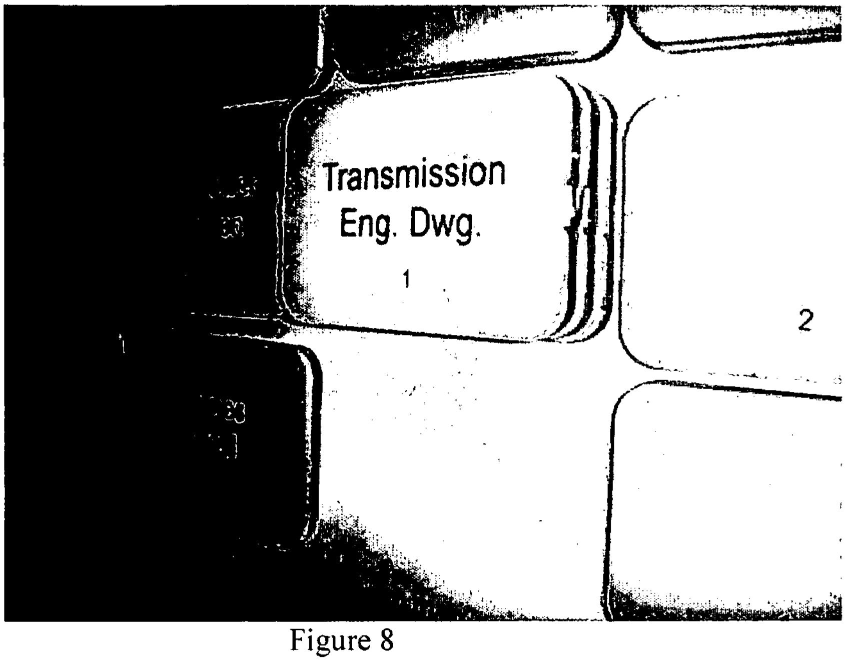
FIG. 8 shows the stacking of items affixed to a magnetic planning board according to the invention.

Finally, the equal spacing of the magnets within the magnetic grid and the unitary item provides additional benefits:

First, as noted above, the equal spacing allows items to be stacked atop one another when attached to the board, as shown in FIG. 8.

Figure 9:
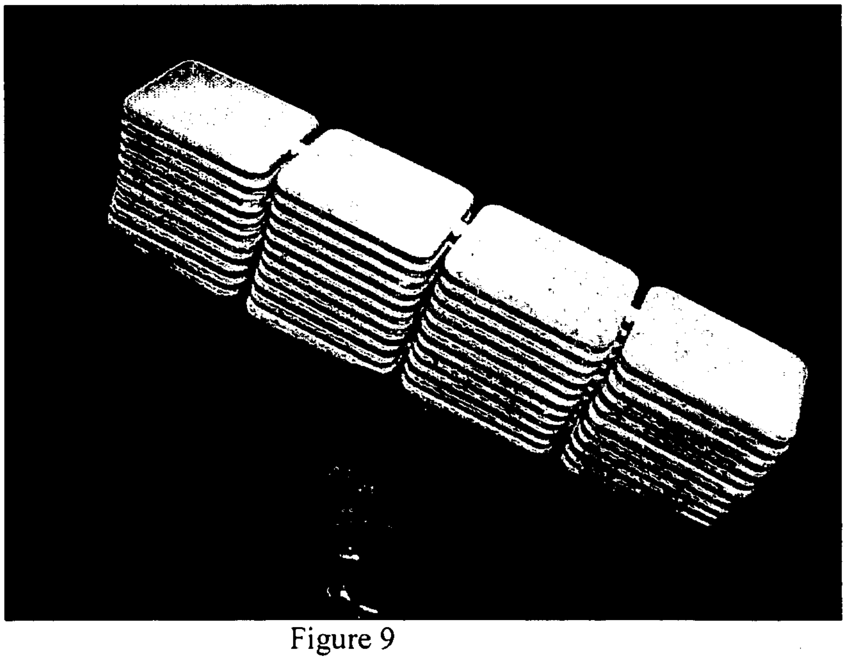
FIG. 9 shows the stacking of items for storage according to the invention.

Second, the equal spacing allows for convenient storage of items not affixed to the board, as shown in FIG. 9.

Alternative Embodiments

The magnets within the magnetic grid and unitary item may be configured in ways other than described above. For example, in one alternative variation, all magnets within the magnetic grid are oriented with the north pole towards the outer layer, and both magnets within the unitary item are oriented with the south pole facing inward. This configuration allows items to be positioned at half-intervals, effectively doubling the number of locations at which an item may be placed. However, this approach does not guarantee that the edges of all items are aligned, as is the case in the preferred embodiment.

In yet another variation, all magnets within the magnetic grid are oriented with the north pole towards the outer layer, but each unitary item contains only a single magnet oriented with the south pole facing inward. This configuration allows placement of items at half-intervals and guarantees the horizontal and vertical alignment of item edges. However, as the items are free (but for friction) to pivot about the single magnetic connection, rotational alignment is no longer guaranteed.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for attaching at least one first, smaller item having a least one planar surface to a second, larger item having at least one planar surface in a precise, yet repositionable manner, comprising the steps of:

providing said larger item with a magnetic grid comprising a plurality of magnets;

positioning said magnetic grid relative to said larger item, wherein magnetic poles of said magnets are evenly spaced on a Cartesian grid; and providing said smaller items, comprising any of unitary items and multi-unit items, for affixation to said larger item, each of said smaller items comprising at least two magnets to secure said planar surface of said smaller item against both translation and rotation to maintain a consistent alignment of said smaller item with said larger item, said at least two magnets separated from one another by a distance equal to said spacing of said magnets on said magnetic grid, said at least two magnets having an attractive force to said plurality of magnets of said larger item, wherein a 1-by-1 unit item covers a horizontal pair of magnets on said magnetic grid, wherein said unitary items comprises sizes of at least all of: a 1-by-1, a 1-by-2, and a 2-by-2 unit item;

wherein, as a user moves said planar surface of a smaller item across said planar surface of said larger item, there is an affirming, snap-to-grid action as said smaller item attains one of a plurality of available aligned positions relative to said larger item.

2. The method of claim 1, wherein provision of said equal spacing of said magnets within said grid and within said smaller items enables the additional step of:

selectively stacking said smaller items atop one another either when apart from or when affixed to said larger item.

3. The method of claim 1, further comprising the steps of:

aligning said magnets in said magnetic grid within a grid alignment layer; and capturing said magnets in said magnetic grid with an outer layer and inner layer that are attached to said grid alignment layer in a sandwich style construction.

4. The method of claim 1, further comprising the step of:

recessing each complementary magnet within a cavity formed within said smaller item, wherein the depth of each said cavity exceeds the thickness of each said magnet;

wherein when a smaller item is affixed to said larger item, a primary material of said smaller item, and not said magnet, serves as a bearing surface.

5. The method of claim 4, further comprising the step of:

providing an additional layer of material having specific frictional qualities to any of said larger item and said smaller item.

6. The method of claim 1, further comprising the step of:

providing one of said larger and smaller items with a protrusion and the other of said larger and smaller items with a mating depression, wherein said protrusion engages with said depression when said smaller item is aligned with said magnetic grid.

7. The method of claim 1, further comprising the step of:

forming said planar surface of said larger item of a whiteboard material.

8. The method of claim 1, further comprising the step of:

forming a surface of said smaller item of a material that may be labeled and relabeled as desired.

9. The method of claim 1, said larger item comprising any of a magnetic calendar and a planning board.

10. A display apparatus, comprising:

a planning display board having an outer surface;

an underlying magnetic grid incorporated into said planning display board;

a plurality of magnetic items that are affixable to said outer surface of said planning display board; and a removable fastening mechanism for linking at least two items of said plurality of magnetic items that are affixable to said planning display board, wherein said removable fastening mechanism allows said at least two of said items to be joined and separated as desired, wherein said magnetic grid ensures that said magnetic items are aligned with one another, and wherein each of said items comprise one or more unit, wherein each of said unit comprises exactly two magnets, wherein a first magnet of said two magnets comprises an outward facing north pole and the second magnet of said two magnets comprises an outward facing south pole relative to said planning display board.

11. A display apparatus, comprising:

a planning display board having an outer surface;

an underlying magnetic grid incorporated into said planning display board; and a plurality of magnetic items that are affixable to said outer surface of said planning display board;

wherein said magnetic grid ensures that said magnetic items are aligned with one another, wherein each of said items comprise one or more unit, wherein each of said unit comprises exactly two magnets, wherein a first magnet of said two magnets comprises an outward facing north pole and the second magnet of said two magnets comprises an outward facing south pole relative to said planning display board; and wherein all magnets within said magnetic grid are oriented with a same one of a north and south pole towards an outer display board surface, and both magnets within each unit of each item are oriented with an attracting pole facing inward toward said display board surface, wherein said items are positionable at half-unit-intervals.

12. A display apparatus, comprising:

a planning display board having an outer surface;

an underlying magnetic grid incorporated into said planning display board; and a plurality of magnetic items that are affixable to said outer surface of said planning display board;

wherein said magnetic grid ensures that said magnetic items are aligned with one another, wherein each of said items comprise one or more unit, wherein each of said unit comprises exactly two magnets, wherein a first magnet of said two magnets comprises an outward facing north pole and the second magnet of said two magnets comprises an outward facing south pole relative to said planning display board; and wherein all magnets within said magnetic grid are oriented with a same one of a north and south pole towards an outer display board surface, and each unit of each item comprises a single magnet oriented with an attracting pole facing inward toward said display board surface, wherein said items are positionable at half-unit-intervals and unit centers are horizontally and vertically aligned.

13. A display apparatus, comprising:

a planning display board having an outer surface;

an underlying magnetic grid incorporated into said planning display board: and a plurality of magnetic items that are affixable to said outer surface of said planning display board;

wherein said magnetic grid ensures that said magnetic items are aligned with one another wherein each of said items comprise one or more unit, wherein each of said unit comprises exactly two magnets, wherein a first magnet of said two magnets comprises an outward facing north pole and the second magnet of said two magnets comprises an outward facing south pole relative to said planning display board; and wherein said planning display board surface comprises:

a whiteboard material.

14. A display apparatus, comprising:

a planning display board having an outer surface;

an underlying magnetic grid incorporated into said planning display board; and a plurality of magnetic items that are affixable to said outer surface of said planning display board;

wherein said magnetic grid ensures that said magnetic items are aligned with one another, wherein each of said items comprise one or more unit, wherein each of said unit comprises exactly two magnets, wherein a first magnet of said two magnets comprises an outward facing north pole and the second magnet of said two magnets comprises an outward facing south pole relative to said planning display board; and wherein said planning display board comprises a magnetic calendar board.

* * * * *